United States Patent
Joyce et al.

(10) Patent No.: US 10,146,514 B1
(45) Date of Patent: Dec. 4, 2018

(54) CENTRALIZED SUPPORT FOR APPLICATION USER INTERFACE ELEMENTS

(71) Applicant: EMC IP Holding Company LLC, Hopkinton, MA (US)

(72) Inventors: Scott E. Joyce, Foxboro, MA (US); Munish Desai, Shrewsbury, MA (US); Sreenath Rajagopal, Ashland, MA (US); Norman M. Miles, Bedford, MA (US); Hongzhen Zhang, Southbourough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1008 days.

(21) Appl. No.: 13/626,323

(22) Filed: Sep. 25, 2012

Related U.S. Application Data

(63) Continuation-in-part of application No. 12/570,716, filed on Sep. 30, 2009, now Pat. No. 8,473,905.

(51) Int. Cl.
*G06F 8/38* (2018.01)
*G06F 3/0481* (2013.01)
*G06F 9/451* (2018.01)

(52) U.S. Cl.
CPC .............. *G06F 8/38* (2013.01); *G06F 3/0481* (2013.01); *G06F 9/454* (2018.02)

(58) Field of Classification Search
CPC ........... G06F 8/34; G06F 8/38; G06F 17/2247
See application file for complete search history.

(56) References Cited

U.S. PATENT DOCUMENTS

| | | | | |
|---|---|---|---|---|
| 5,999,944 | A * | 12/1999 | Lipkin | G06F 17/30572 |
| 6,002,867 | A * | 12/1999 | Jazdzewski | 717/105 |
| 6,025,836 | A * | 2/2000 | McBride | G06F 8/38 |
| | | | | 715/750 |
| 6,083,276 | A * | 7/2000 | Davidson et al. | 717/107 |
| 6,252,589 | B1 * | 6/2001 | Rettig | G06F 9/4448 |
| | | | | 704/8 |
| 6,342,907 | B1 * | 1/2002 | Petty et al. | 715/762 |
| 6,348,927 | B1 * | 2/2002 | Lipkin | H04L 67/02 |
| | | | | 345/419 |
| 6,490,547 | B1 * | 12/2002 | Atkin | G06F 17/289 |
| | | | | 704/3 |

(Continued)

OTHER PUBLICATIONS

Author: Andoid Developers, Title: "Localization", Date: Sep. 26, 2009, pp. 1-8.*

*Primary Examiner* — Ajay M Bhatia
*Assistant Examiner* — Phoebe X Pan
(74) *Attorney, Agent, or Firm* — Muirhead and Saturnelli, LLC

(57) ABSTRACT

Described are techniques for displaying a user interface of an application. A property file identifies a user interface element included in the user interface and specifies a first value for a first property of the user interface element. Executing the application includes: creating the user interface element having a set of properties and a default value for each property in the set; obtaining and processing the property file, setting the first property to the first value rather than the default value, wherein if the first value is not specified in the property file, the first property is set to the default value; and displaying the user interface including the user interface element in accordance with the first value.

20 Claims, 8 Drawing Sheets

(56) References Cited

U.S. PATENT DOCUMENTS

| | | | |
|---|---|---|---|
| 6,633,888 B1* | 10/2003 | Kobayashi | |
| 7,243,335 B1* | 7/2007 | Andrew et al. | 717/115 |
| 2003/0025732 A1* | 2/2003 | Prichard | 345/765 |
| 2003/0084401 A1* | 5/2003 | Abel | G06F 17/30867 |
| | | | 715/205 |
| 2003/0110469 A1* | 6/2003 | Jackson | G06F 9/4448 |
| | | | 717/113 |
| 2003/0135825 A1* | 7/2003 | Gertner | G06F 17/2247 |
| | | | 715/230 |
| 2004/0261032 A1* | 12/2004 | Olander et al. | 715/747 |
| 2006/0004725 A1* | 1/2006 | Abraido-Fandino | |
| | | | G06F 17/30864 |
| 2006/0210026 A1* | 9/2006 | Duplessis | G06F 9/4448 |
| | | | 379/88.05 |
| 2007/0118844 A1* | 5/2007 | Huang | G06F 9/465 |
| | | | 719/330 |
| 2007/0136658 A1* | 6/2007 | Feigenbaum et al. | 715/513 |
| 2008/0016466 A1* | 1/2008 | Grasser | G06F 8/36 |
| | | | 715/835 |
| 2011/0214078 A1* | 9/2011 | Klask et al. | 715/763 |
| 2012/0036265 A1* | 2/2012 | Meyler | G06F 17/3087 |
| | | | 709/226 |
| 2013/0167048 A1* | 6/2013 | Viol et al. | 715/762 |

* cited by examiner

CENTRALIZED SUPPORT FOR APPLICATION USER INTERFACE ELEMENTS

RELATED APPLICATIONS

This application is a continuation in part of U.S. patent application Ser. No. 12/570,716, filed on Sep. 30, 2009, MANAGING USER INTERFACE CHARACTERISTICS IN DISPLAYING DATA STORAGE SYSTEM INFORMATION, which is incorporated by reference herein.

BACKGROUND

Technical Field

This application generally relates to user interfaces and more particularly to controlling characteristics of user interface elements of a user interface.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with an application for management of data storage systems, or more generally any application, a user interface may be displayed. Existing applications providing a user interface may control various aspects of user interface elements, such as visual aspects of buttons, displayed text, and the like, by setting properties of the user interface elements within the application code.

SUMMARY OF THE INVENTION

In accordance with one aspect of the invention is a method of displaying a user interface of an application comprising: providing a property file identifying a user interface element included in the user interface of the application and specifying a first value for a first property of said user interface element; executing said application, wherein said executing said application includes performing first processing comprising: creating said user interface element, said user interface element having a set of one or more properties and a default value for each property in said set, said set of one or more properties including said first property; obtaining and processing said property file that identifies said user interface element and specifies said first value for the first property of said set; setting said first property to said first value rather than said default value, wherein if said first value is not specified in said property file, said first property is set to said default value; and displaying the user interface including the user interface element in accordance with said first value. The first property may affect a visual aspect of said user interface element when displayed. The first property may affect any of a font, a text size, a color, a physical dimension, a height, a width, and a location or placement of said user interface element in connection with said displaying. The first property may affect any of an ordering of said user interface element relative to one or more other user interface elements, a target location from which a webpage is retrieved responsive to selecting the user interface element associated with said target location, and a location of a file that includes an image displayed in connection with said user interface element. The first property may affect user interaction with said user interface element. The first property may affect whether said user interface element is any of enabled, disabled and hidden when displaying the user interface. The user interface element may be any of a menu, a menu bar, a menu item, a text box, a button, a navigation section including one or more hyperlinks, a hyperlink, a table, a drop-down list, a list box, a check box, a dialog box, a wizard, and a combo box. The property file may be one of a plurality of property files included in a predetermined look-up chain of property files. The predetermined look-up chain of property files may define an ordered list of the property files from which property values are retrieved. The first property values may be read from a first property file included in said predetermined look-up chain prior to reading second property values from a second property file. A third value may be specified for one property in said first property file and a fourth value may be specified for said one property in said second property file whereby said one property may be set to said fourth value that overrides said third value due to the order in which the property files are read in accordance with said predetermined look-up chain. The predetermined look-up chain of the property files may include one or more property files in accordance with a chain of entities distributing said application thereby providing for user interface customizations by said entities. The predetermined look-up chain of the property files may include one or more property files specifying different user interface settings customized in accordance with any of a geographic location, language, and dialect of a particular language. Each file in the predetermined look-up chain may be determined in accordance with a file naming pattern or convention. The property file may include a key-value pair to specify said first value for said first property of said user interface element. A look-up service may be invoked to locate the property files of the predetermined look-up chain and to process content of the property files of the predetermined look-up chain in accordance with said ordered list to determine final values for properties included in any of the property files.

In accordance with another aspect of the invention is a computer readable medium comprising code stored thereon for displaying a user interface of an application, the computer readable medium comprising code for: receiving a property file identifying a user interface element included in the user interface of the application and specifying a first value for a first property of said user interface element; executing said application, wherein said executing said application includes performing first processing comprising: creating said user interface element, said user interface element having a set of one or more properties and a default value for each property in said set, said set of one or more properties including said first property; obtaining and processing said property file that identifies said user interface element and specifies said first value for the first property of said set; setting said first property to said first value rather than said default value, wherein if said first value is not specified in said property file, said first property is set to said default value; and displaying the user interface including the user interface element in accordance with said first value. The first property may affect any of a visual aspect of said user interface element when displayed, and user interaction with said user interface element. The first property may affect any of a font, a text size, a color, a physical dimension, a height, a width, and a location or placement of said user interface element in connection with said displaying. The first property may affect any of an ordering of said user interface element relative to one or more other user interface elements, a target location from which a webpage is retrieved responsive to selecting the user interface element associated with said target location, a location of a file that includes an image displayed in connection with said user interface element, and whether said user interface element is any of enabled, disabled and hidden when displaying the user interface.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF
EMBODIMENT(S)

Figure 1:
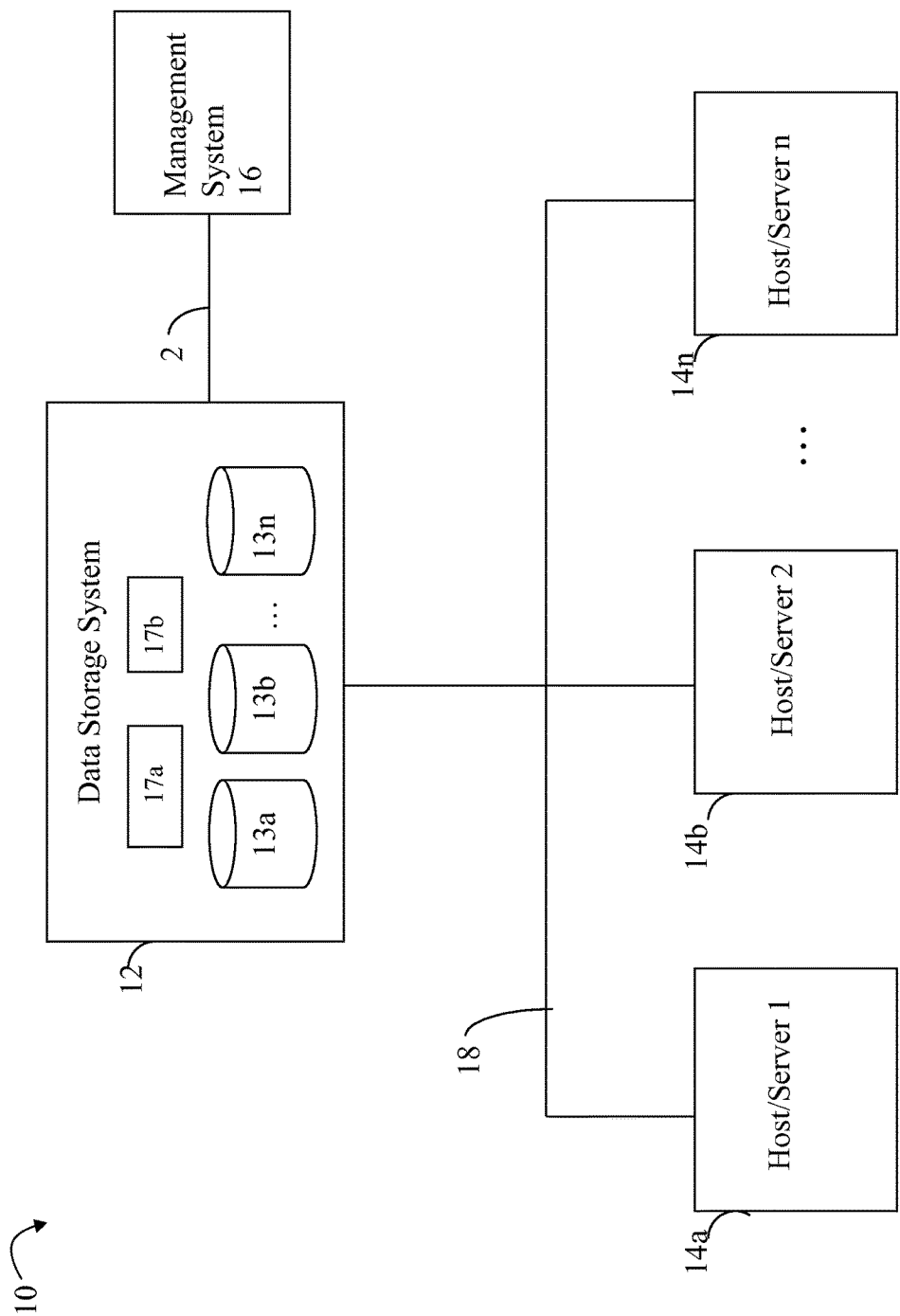
FIG. 1 is an example of an embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the system 10. In one embodiment, the communication medium 2 may be a LAN connection and the communication medium 18 may be an iSCSI or Fibre Channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems and management system 16 may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

The data storage system may be a single unitary data storage system, such as single data storage array, including two service processors or compute processing units. Techniques herein may be more generally use in connection with any one or more data storage system each including a different number of service processors than as illustrated herein. The data storage system 12 may be a data storage array, such as a VNX™ data storage array by EMC Corporation of Hopkinton, Mass., including a plurality of data storage devices 13a-13n and two service or storage processors 17a, 17b. The service processors 17a, 17b may be computer processing units included in the data storage system for processing requests and commands. In connection with performing techniques herein, an embodiment of the data storage system may include multiple service processors including more than two service processors as described. The VNX™ data storage system mentioned above may include two service processors 17a, 17b for performing processing in connection with servicing requests. Additionally, the two service processors 17a, 17b may be used in connection with failover processing when communicating with the management system 16. Client software on the management system 16 may be used in connection with performing data storage system management by issuing commands to the data storage system 12 and/or receiving responses from the data storage system 12 over connection 2. In one embodiment, the management system 16 may be a laptop or desktop computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 2:
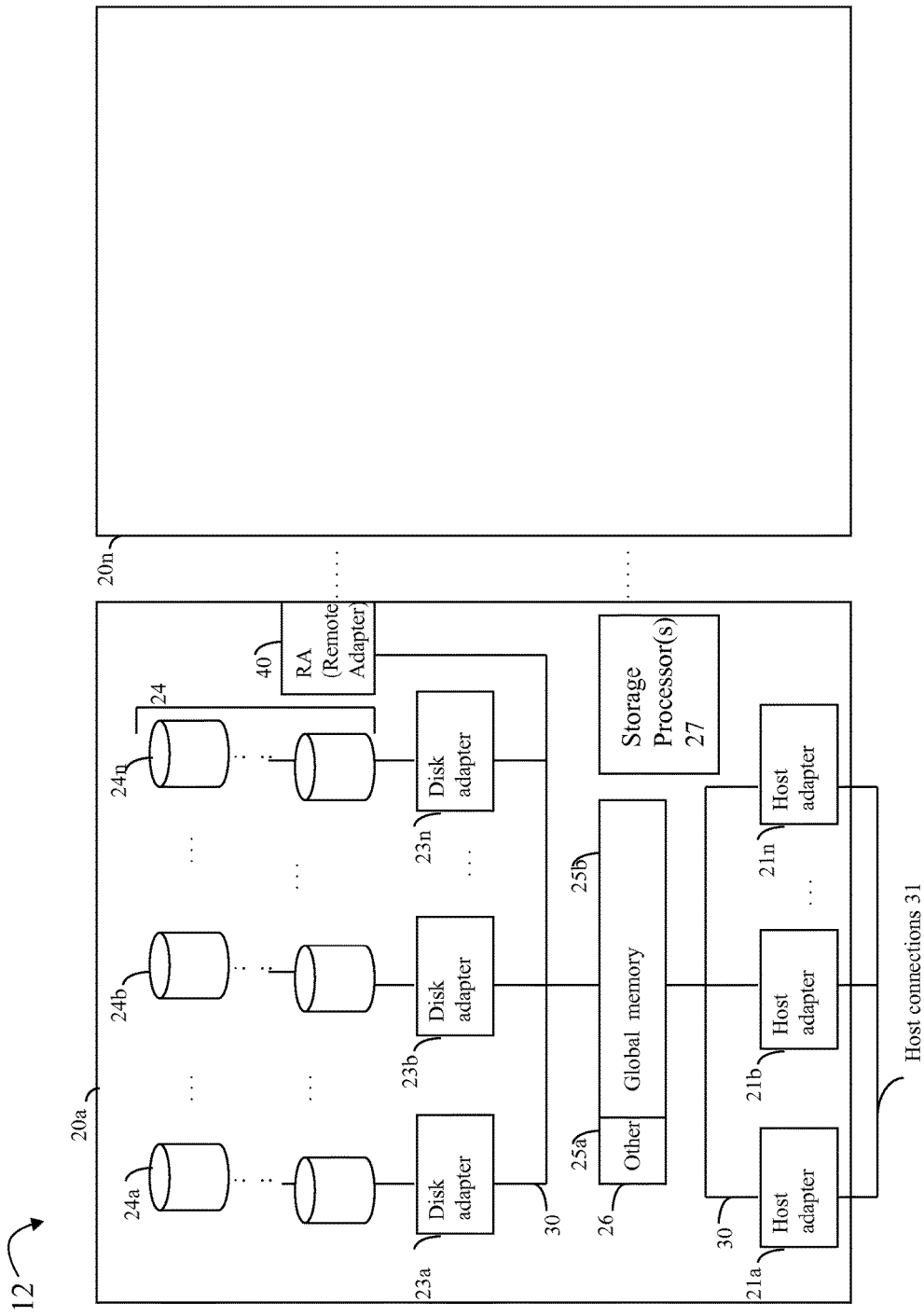
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the VNX™ data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

Also shown in the storage system 20a is an RA or remote adapter 40. The RA may be hardware including a processor used to facilitate communication between data storage systems, such as between two of the same or different types of data storage systems.

A configuration of a data storage system may be described by data storage configuration information. The data storage configuration information may describe various entities, attributes, and the like, about how the physical storage systems and devices are configured such as by a manager or system administrator. For example, the data storage configuration information may identify and describe LUNs, file systems, RAID groups, and the like, as may be formed using the physical data storage of the data storage system. With reference back to FIG. 1 in one embodiment, management software may be executing on the management system 16 where the user may be issuing requests in connection with reading and/or writing data storage configuration information that may be stored on physical storage device of the data storage system 12. More generally, the management system 16 may be referred to as a client issuing requests to the data storage system 12 which acts as a server to service the client requests (e.g., read and write requests) for data storage configuration information.

In general, a storage area network (SAN) may be characterized as a collection of data storage systems that are networked together via a switching fabric to a number of host computer systems operating as servers such as illustrated in FIG. 1.

Data storage management applications may include a graphical user interface (GUI) that enables a network manager to graphically manage, control, and configure various types of hardware and software resources associated with a corresponding managed storage area network and its data storage systems. The management application may execute, for example, on the management system 16 of FIG. 1. The management application may generate a graphical user interface utilized by a storage administrator to graphically select, interact with, and manage local or remote devices and software processes associated with the storage area network. Based on use of the graphical user interface in combination with an input device such as a hand operated mouse and corresponding pointer displayed on a viewing screen or other display, a storage administrator is able to manage hardware and software entities such as file systems, databases, storage devices, volumes, peripherals, network data communications devices, etc., associated with the storage area network. Consequently, the storage management system 16 and associated management software enables a storage administrator (a person responsible for managing the storage network) to manage the storage area network and its resources.

One example of this kind of GUI includes a screen presentation that may include toolbars with accompanying menus and menu items as well as displays such as graphs, tables, maps or trees. The management application providing the GUI may be written in any suitable language such as JavaScript, Flex, and the like.

Described in following paragraphs are techniques that may be used in connection with centralized support for user application controls such as user interface elements of a displayed user interface. Such techniques may be used, for example, in connection with the management and control of user interface characteristics in displaying data storage system information. Although examples and references herein may be made with respect to a GUI of an application for data storage management, more generally, the techniques herein may be used in connection with any suitable user interface (UI) for any application. Using techniques described below, various characteristics and aspects (also referred to herein as properties) of UI elements, such as related to the "look and feel" of a GUI, may be controlled and customized. Look and feel may include aspects of UI elements related to the look or visual appearance of the elements and also the way the user interacts with the UI element (the feel). For example, enabling, disabling or hiding a UI element such as a text box, radio button, menu, and the like, may be characterized in one aspect as affecting the way a user interacts with the UI element. It should be noted that a UI element that a user interacts with may also be known as a control or widget. Aspects related to the look, such as various visual aspects of a UI element, may include, for example, colors, shapes, layout, fonts, font sizes, whether text is italicized, bolded, the image displayed in connection with an icon associated with a UI element, and the like.

In accordance with techniques described herein, an embodiment may use one or more property files which provide for further specifying characteristics of UI elements. Such property files may be included in a defined hierarchy or lookup chain specifying an ordered list in which the property files are read and processed by a look-up service. The files may specify properties of UI elements denoting particular settings of the properties defining characteristics of the UI elements, such as related to the look and feel of the UI elements. The order in which the property files are read affects the order or precedence in which a property obtains its value setting whereby a same property may have a first value in a first property file and the same property may have second value in a second property file. If the first property file is processed in accordance with the look-up chain prior to the second property file, the property may be set to a final value of the second value whereby the subsequent setting of the property to the second value in the second property file overrides the previous first value as specified in the first property file. The property files may be processed at runtime when executing the application thereby provided a means for modifying and customizing UI element characteristics without modifying code of the application. A UI element may be created with a default set of properties and associated values by the application within the application code. When executing the application and processing a property file, any property having a value in a property file may be used to customize or override the default value for the property as specified in the application code, or a previously processed property file. If the property is not provided with an updated value in a property file, the property may retain its default value as may be provided in the application code. In this manner, when there are multiple property files, a layering approach may be provided for customization of property values based on the order in which the multiple property files are processed in the look-up chain. No property file may be required whereby the properties have values as may be specified in the application code. If a property file is specified, the property file may optionally include values for any number of properties which the application permits to be modified using the property file. In the event that multiple property files are processed based on the look-up chain, any property specified as having multiple values in multiple files may retain the value setting of the lastly processed property file in the chain. This is described in more detail in following paragraphs.

Providing for customization of UI elements has many uses, some examples of which are described herein. For example, a vendor may build and release into market an application that is then purchased for resale and/or redistribution such as by another third party. The third party may purchase the application produced by the vendor and the third party may incorporate or bundle the application with the third party's own software and/or hardware. The third party may want to customize UI elements of the application to have a particular look and feel consistent with branding for third party products whereby products sold or distributed by the third party (including the application of the vendor being bundled by the third party) may have a particular look and feel. In this manner, the third party may brand the application for its own purpose such as, for example, to reflect the third party brand by changing displayed text so as to identify the third party, changing displayed icons denoting the third party brand, and the like. Additionally, the third party may want to disable (e.g., such as through greying out a displayed UI element) or otherwise hide (e.g., whereby the UI element is not visible on the UI displayed) particular UI elements, such as buttons, menus, and the like, whereby the default of such UI elements may otherwise be enabled by the application code by default. Whether a particular UI element is enabled, disabled or hidden may depend on the particular functionality provided by the third party. Such customization of aspects of UI elements may be used in connection with one or more third parties in the sale and distribution chain of the application alone, or in combination with, providing customization of aspects of UI elements due to different human languages and dialects as may vary with geographical location (e.g., country or region in a country). This is described in more detail in following paragraphs.

Although exemplary uses herein may be made with reference to particular UI elements, it will be appreciated that techniques herein may be used in connection with any suitable UI element of an interface. UI elements may include, for example, a menu, a menu bar, a menu item, a text box, a button (e.g., radio button, cycle button), a wizard, a navigation section including one or more hyperlinks, a table, a drop-down list, a list box, a check box, a dialog box, and a combo box. Menus allow the user to execute commands by selecting from a list of choices. Menu options are selected, for example, with a mouse or other pointing device within a GUI. A keyboard may also be used. A menu may be, for example, a pull-down menu displayed in response to a user selection. A menu bar may be displayed horizontally across the top of the screen and/or along the tops of some or all windows. A software wizard is a UI type that presents a user with a sequence of dialog boxes that lead the user through a series of well-defined steps. A text box may be a box in which to enter text or numbers. A hyperlink may be displayed as text with some visual indicator (such as underlining and/or color) indicating that selecting the link will result in linking or displaying another screen or page. Properties of a hyperlink may relate to whether the hyperlink is enabled, disabled or hidden. If enabled, the particular path or location identifying a website or the web page may be displayed in response to selection of the hyperlink. A drop-down list may be a list of items from which to select. The list normally only displays items when a special button or indicator is selected. A list box allows a user to select one or more items from a list contained within a static, multiple line text box. A combo-box may be a combination of a drop-down list or list box and a single-line textbox, allowing the user to either type a value directly into the control or choose from the list of existing options. A check box indicates an "on" or "off" state via a check mark ☑ or a cross ☒. . A radio butting is similar to a check-box, except that only one item in a group can be selected. Its name comes from the mechanical push-button group on a car radio receiver. Selecting a new item from the group's buttons also deselects the previously selected button. A cycle button is a type of button that cycles its content through two or more values, thus enabling selection of one from a group of items. A table may also be referred to as a grid in which numbers and/or text may be displayed in rows and columns. The foregoing are some examples of UI elements that may be supported in an embodiment in accordance with techniques herein. A UI element may have a property identifying a location of an image or other file used to display an icon associated with the UI element. An icon is a small picture. Icons may be useful, for example, to display an image in connection with branding such as related to a particular vendor or service. A same image may also be associated with a common operation, file type, and the like. For example, a scissors icon may represent a menu option to cut whereby such an icon may be commonly used across many applications from one or more vendors, third parties, and the like, which may sell different applications.

Using techniques herein, UI content (e.g., strings), settings of style-based properties and other properties related to UI controls may be included in one or more property files to provide customization for any suitable purpose including, for example, to provide customization by a vendor of an application, provide customization of the UI by a third party reselling or redistributing the application of another, provide customization for aspects of UI elements such as related to language differences, and the like. An embodiment using techniques herein may provide for such customization of an application's UI after an application has been built and distributed without requiring changes to the application code to provide customizations. Processing may be performed to automatically and dynamically perform a lookup of the correct property files for human language translation as well as for customization by third parties reselling and/or redistributing an application provided by another original application vendor. The one or more property files provide for a generic and centralized ability to enable/disable and/or hide UI controls throughout the application. The one or more property files may include an application-wide unique control identifier to uniquely identify a particular UI element. For such a UI element, the property file may also identify a particular property and a value to which the property is set. This property file is inserted into the lookup procedure and process as described in more detail herein. If there is no entry for a UI element or property of a UI element in the property file, then that UI element is processed/displayed without modification from any default specified by the application code. Techniques herein may be used to generically support the ability to disable or hide any/all UI elements such as by setting the property of a particular UI element to a value denoting the selected state of enabled, disabled or hidden. Generally, the techniques herein may be used to specify a value or setting of any property of a UI element. The properties may include those as described above related to displayed text, display state (e.g., enabled/disable/hide) of a UI element, an ordering of displayed elements or text (left to right, right to left (e.g., may be language dependent or vary with whether a particular language has its text read from left to right or right to left), ordering of menu items such as displayed in pull-down menu, size or physical dimensions of a UI element (e.g., width, height), location/position of button on UI display (e.g., may be an absolute or relative location as displayed), sort ordering of buttons or UI element on screen, ordering or position of displayed text in table, listing of UI elements, and the like.

Figure 3:
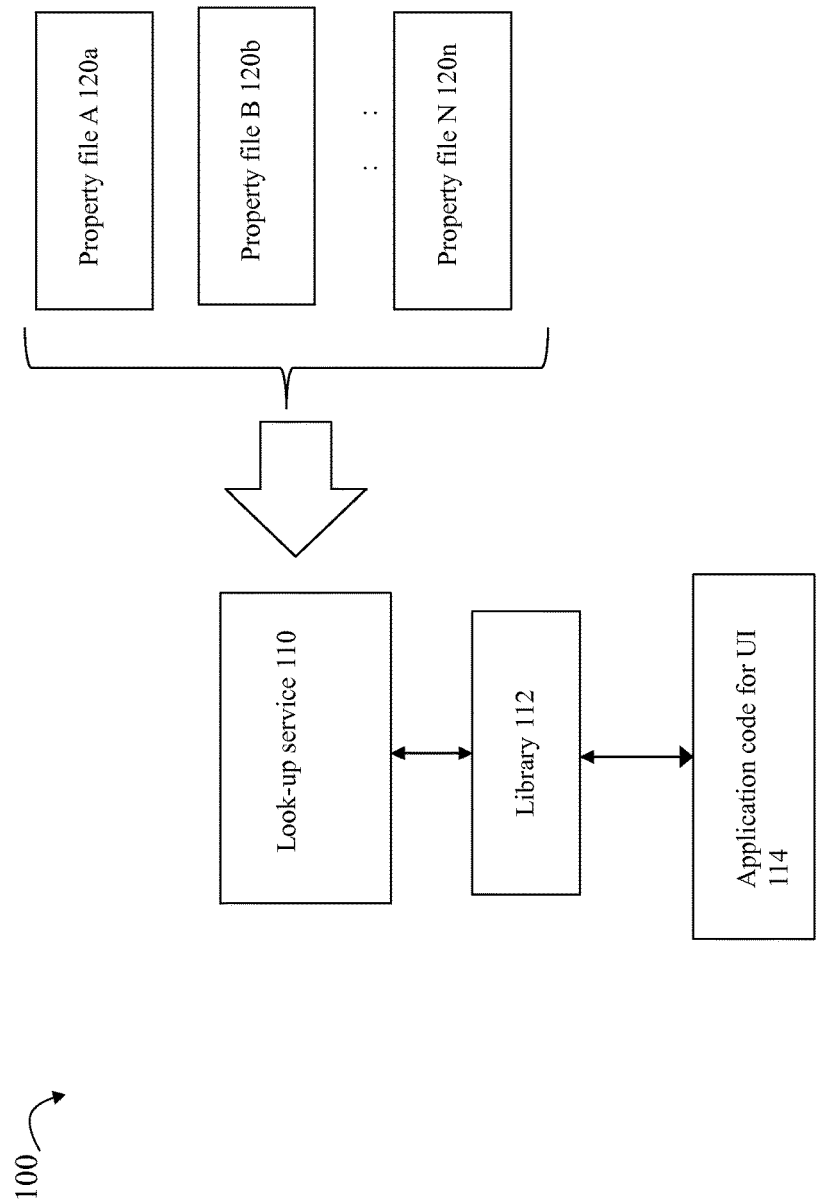
FIG. 3 is an example of components that may be included in an embodiment in accordance with techniques herein.

Referring to FIG. 3, shown is an example of components that may be included in an embodiment in accordance with techniques herein. The components of the example 100 may be included a management system 16 for an application and its UI used in connection with management of data storage system(s). The example 100 includes application code 114 which includes code for rendering a UI, a library 112, and a look-up service 110. The application code 114 may be linked against a library 112 of routines or methods which are invoked in connection with displaying UI elements of a GUI of the application code 114. In turn, code of the library 112 communicates with the look-up service 110 which is a runtime look-up service that reads and processes property files 120a-120n based on a look-up chain of property files providing a predefined or predetermined ordering in which the property files are processed by the look-up service 110. At runtime, information may be returned from 110 to 112 and then from 112 to 114 as illustrated.

The property files 120a-120n may include content and, more generally, values for properties affecting the manner in which UI elements of a UI are displayed and operate. The content may include, for example, values for strings, icons such as images, and the like. When there is a desire to possibly vary such content, an embodiment may partition the content and other property settings of the UI elements from other code that may be used to render the UI. Furthermore, an embodiment may provide support for multiple property files 120a-120n to be used with the UI. For example, the UI may include multi-lingual support providing for customized language-dependent UI elements depending on the particular language of the country or locality. In this manner, support in the UI may be included for multiple different language by having a different property file for each particular language-dependent UI elements such as displayed text in a particular language. In this case, there may be a defined look-up chain or prioritized list of property files that may exist for use in connection with defining elements and values displayed in connection with a UI for the application Each of the properties files may have a name formed from predetermined naming conventions. For example, a property file may have a name formed based on the following pattern:

APP_XX_YY.PROP whereby APP denotes the application, XX is a two letter coding denoting a particular language and YY is a two letter coding denoting a particular country. To further illustrate, there may be default or first language property file for English as used in the US named APP_EN_US.PROP which includes UI language dependent content elements specified in English. Similarly, the name of a property file including French content or UI dependent language elements for use in countries such as France may be APP_FR_FR.PROP based on such predetermined naming conventions.

In connection with the foregoing naming convention, a defined hierarchy or order of precedence may be defined for the different possible property file names indicating the order in which content, such as a value for a string or image for an icon, is determined by the UI. For example, there may be a first property file such as APP_EN_US.PROP. The look-up chain may provide for optionally specifying and using one or more other property files which may override values and definitions of the foregoing first file. The above-mentioned French property file of APP_FR_FR.PROP may be an example of an optional property file of the defined look-up chain whereby any values specified in the French file may override or replace values of the English file (e.g., first property file). Code of the UI may always look for and utilize the default English property file. Additionally, for example, if the UI is executing in a particular country or based on particular language or country configurations settings for the UI, processing may also form the name of a second property file, such as the French property file, based on the predetermined file naming conventions for the desired language and country. Processing may be performed such as by the look-up service 110 to attempt to locate the second property file in one or more expected or known locations (e.g., particular devices and/or directories). If the second property file exists, the UI may use the combination of values of both the first property file and the second property file in defining elements of the UI. If there is any conflict between a value in the first and second property files, the value specified in the second property file overrides that specified in the first property file. For example, the first property file may specify a value for a string or tag in English displayed in the UI such as for a label in a menu or menu item, content of a button, and the like. The second property file may also specify a value for the same UI element property but in French. If the second property file exists, the UI uses the property value for the UI element of the second property file. Otherwise, if the second property file does not exist, the UI uses the property value of the UI element value of the first property file. It should be noted that if there is no property files or any one or more property files are empty, the UI elements may retain any default settings for the property values as specified within the application code 114 and/or library 112.

It should be noted that for simplicity of illustration, the above-noted naming convention for a property file may provide support for a single lookup chain of property files per application. As will be appreciated by those skilled in the art, an embodiment may provide support for having multiple independent lookup chains of property files per application using a different suitable naming convention. For example, the following may denote a property file naming convention pattern for an application for multiple lookup chains of property files:

APP_CHAINP_XX_YY.PROP where APP, XX and YY are as described above and elsewhere herein and CHAINP denotes a particular lookup chain of property files whereby each lookup chain may be uniquely associated with a different "P" as included in "CHAINP" (e.g., P may be an integer uniquely identifying a particular lookup chain of property files where each chain has its own possible variant of property files for language variation and customizations, distribution and/or sales chain customizations as described elsewhere herein, and the like). More generally, a predefined pattern denoting the property file names may or may not include a portion denoting the application.

In addition to defining a look-up chain of predetermined property files providing for language and/or geographic customizations, the look-up chain may also include one or more property files providing for UI element customization by one or more entities of the distribution and/or sales chain of the application. For example, as described elsewhere herein, a vendor may be a first vendor that builds and releases the application 114. The application 114 may be purchased by a second vendor which bundles the application with other hardware and/or software which is then sold to a customer or perhaps yet another third vendor. The look-up chain may allow for each of the first vendor, second vendor, and any other vendor in the distribution or sales chain of the application to provide one or more property files customizing UI elements.

For example, the look-up chain may include a predetermined sequence of property file names whereby the first vendor and the second vendor may optionally provide a property file for each possible geographic location or language variant. In this manner, the look-up service 110 may always look for each file in the predetermined sequence of possible property files.

As noted above, APP_XX_YY.PROP may denote that naming convention for the property file(s) provided by the first vendor. Each additional vendor (denoted "Vn" where "n" is an integer denoting the next vendor in the sales or distribution chain) in the look-up chain may provide property files of the general form APP_XX_YY Vn.PROP. To further illustrate for the example where there are the above-mentioned first and second vendors, assume that each such vendor may provide for UI customization for two countries—the US and for France. The look-up chain may be configured to include four files based on the above-noted file naming convention:

| 1. APP_EN_US.PROP | /* denoting the first vendor's US customization property file */ |
| 2. APP_EN_US_V2.PROP | /* denoting the second vendor's US customization property file */ |
| 3. APP_FR_FR.PROP | /* denoting the first vendor's French customization property file */ |
| 4. APP_FR_FR_V2.PROP | /* denoting the second vendor's French customization property file*/ |

Such a look-up chain of property files may be represented by property files 120*a*-120*n* whereby the look-up chain of property files is traversed in the order from 1 through 4 at runtime by the look-up service 110. In this example, if the application is used in the US, the look-up service may not look for any French language property files (3 and 4 above) and only look for English language property files 1 and 2 above. If the application is used in France, the look-up service may utilize a look-up chain including all 4 files and attempt to locate all four property files (1-4 above). In this manner, any property values included in the fourth property file APP_FR_FR_V2.PROP by the second vendor may override any other UI customizations provided by the first vendor and may also override any other UI customizations provided for by the US or English variations of either vendor.

In connection with the foregoing example, it should be noted that only a single language is associated with each of the countries of France and the US for each of the vendors. However, based on the predetermined property file naming convention described above, an embodiment may provide for multiple language customizations for each vendor through multiple property files for a single country. For example, for the US, English and Spanish UI customizations may be provided by the first vendor through two different property files, respectively, APP_US_EN.PROP (English UI property value customizations) and APP_US_SP.PROP (Spanish UI property value customizations).

It should be noted that any number of possible property files may be included in the look-up chain for any number of vendors, or more generally, entities, in the sales or distribution chain of the application. Additionally, each such entity in the distribution or sales chain may be allowed to provide one or more property files for use such as based on language or geographic customizations as well as for other purposes.

Referring back to FIG. 3, the look-up service 110 may provide property value information at runtime to the library 112 which is, in turn, provided to the application code's UI when rendering a page for display. The code 114 may call a method or routine in the library 112 which, in turn, invokes the look-up service 110 at runtime to determine properties for particular UI elements being displayed for the application's UI. The look-up service 110 may use the information obtained from the one or more property files 120*a*-120*n*. For example, the look-up service 110 may attempt to locate and read the contents of the four property files as noted above. The service 110 may process the property files based on the predetermined ordering of the look-up chain and may determine a resulting property value for any property defined in one or more property files.

Each UI element may be uniquely identified by a unique identifier (ID) associated with the particular UI element. A particular property may be referenced for a UI element as ID.property. In some embodiments, the property file may specify or assign a value to a property using name-value pairing such as ID.Property=value. When the application code inquires or queries regarding different property values from the library and the look-up service, the APIs (application programming interfaces) defined between 114 and 112 and/or 112 and 110 may allow an inquiry regarding all properties of a particular UI element by specifying just the ID without identifying any particular property. The API may also return a value for one or more particular properties by allowing requests for particular instances of ID.property1, ID.property2, and the like. Additionally, property values returned may be in any suitable form based on the defined API. The property values returned for an ID may be, for example, in the form of a string of all properties having a value obtained from the one or more property files.

It should be noted that if a property is not specified in one of the property files, a null may be returned for that property from the look-up service 110 to the library 112 meaning that there is no change to any default value as may be specified by the application code 114 and/or library 112.

As a further illustration, an application developer may create a dialog or other code 114 which is executed in connection with an application GUI. The code 114 may include UI elements defined in a base class by the library 112. The developer code 114 may use such UI elements in connection with creating and rendering a GUI. For example, a UI element included in a class of the library 112 may be a button, EMC_button, having a particular ID which is initialized when rendering the UI. An instance of EMC_Button may be referenced in the developer code 114 as a UI element. The library 112 may be linked and loaded for use with the developer code 114. The developer code 114 may create an instance of an object of the class EMC_Button for use in the developer's UI. Changes affecting properties of such UI elements utilized by the developer code (application) may be made using one or more property files. As part of initialization of the UI element of class EMC_Button, a method or routine "init" of the library 112 supplied for use by the developer code 114 may be invoked to retrieve the properties of the UI element prior to rendering the instance of the UI element, EMC_Button, on a display. The library init routine or method may invoke the lookup service to obtain one or more property values for the UI element. The following may represent a pseudo-code like representation of code included in the library 112 for processing performed in connection with the above-mentioned init method or routine which may be implicitly invoked as part of initializing a UI element displayed by the application or developer code 114. The following provides for returning a single property value of size but may be generalized to return multiple different property values from the look-up service

```
init ID
{
    string.size = lookupservice.get_property(ID + "size"); /*
                  another method which calls lookup service
                  where "size" is the property name **/
    if string.size !=NULL
    {
        set ID.size = size;
    }
    else
    {
        set ID.size = default_size;
    }
    return (string.size)
}
```

The developer or application code may create an instance of an object of the class EMC_Button for use in the developer's UI. Value changes affecting properties of such UI elements like instances of EMC_Button utilized by the developer code (application) may be made using the one or more property files 120a-n processed at runtime. In this manner, a vendor may ship an application with a UI 114 which uses the library 112. A third party may be allowed to further customize UI elements of the application through the use of a customized third party supplied property file of the look-up chain since the property file may be read in by the lookup service at runtime when executing the application. In this manner, changes (such as customized by the third party) may be made to the displayed UI elements of the application after the application is distributed by the original vendor without making further changes to the application code.

It should be noted in the above snippet for init, the library routine or method init may specify a default value if there is no value specified in any of the property files. However, it should be noted that other code included in the application may also provide or specify such a default value should no other value be specified in any of the property files.

What will now be described in following paragraphs are additional exemplary uses of the techniques herein using property files for UI customization as may be performed by an embodiment.

Figure 4:
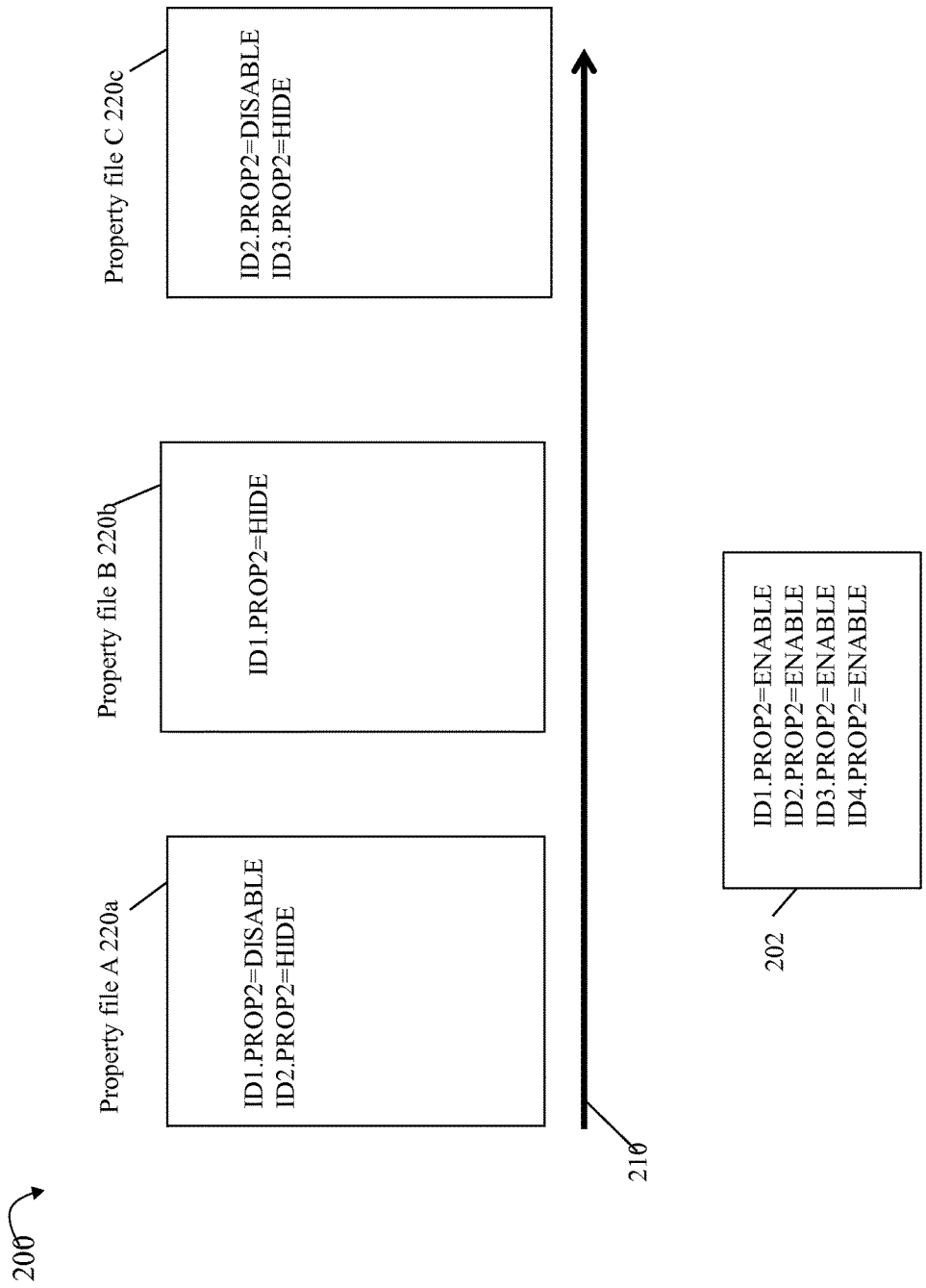
FIGS. 4-8 illustrate examples of property files and UIs in an embodiment in accordance with techniques herein.

Referring to FIG. 4, shown is an example 200 including 3 property files 220a-c included in the look-up chain of property files read and processed by the look-up service 110 of FIG. 3. Directional arrow 210 may illustrate the predetermined left to right ordering in which the property files 220a-c are processed (e.g., property file A 220a is first processed, followed by property file B 220b which is then followed by property file C 220c). In this manner, property values in 220c may override any of the same property values specified in 220b and 220a. Furthermore, if a property value is specified for a property in 220a and 220b but not 220c, the value of 220b is the final resulting property value. A UI element is denoted by a unique ID. In this example, there are four UI elements denoted by ID1, ID2, ID3 and ID4. A particular property (PROPn) of a UI element (having IDn) is denoted as "IDn.PROPn". Property values may be specified using key-value pairs. For example, property PROPn of a UI element having IDX may be assigned a value VAL in the property file as follows: IDX.PROPn=VAL.

Element 202 may identify default values specified for different properties of each of the four UI elements ID1-ID4. Such default values of 202 may be defined by the application code 114 and/or library 112 if property values are not otherwise specified in any of the property files 220a-220c. In this example, each of the UI elements may have a first property, PROP2, denoting a display state of the corresponding UI element as one of enabled (ENABLE), disabled (DISABLE) or hidden (HIDE). By default as denoted by 202, all four UI elements may be enabled. When a UI element is enabled, it is displayed in the UI and active. When a UI element is disabled, it may be displayed in the UI (such as a greyed out UI element) but is not active or available for user interaction. When a UI element is hidden, it does not appear in the displayed UI. For UI element ID1, the property value for ID1.PROP2 is determined by first retrieving the value of DISABLE from property file 220a and the second value of HIDE from property file 220b. Although property file 220c exists, it does not specify any property value for ID1.PROP2 and therefore the final resulting value for ID1.PROP2 is HIDE (as specified in file 220b).

For UI element ID2, the property value for ID2.PROP2 is determined by first retrieving the value of HIDE from property file 220a and the second value of DISABLE from property file 220c. Although property file 220b exists, it does not specify any property value for ID2.PROP2 and therefore the final resulting value for ID2.PROP2 is DISABLE (as specified in file 220c).

For UI element ID3, the property value for ID3.PROP2 is determined by retrieving the value of HIDE from property file 220c. Although property files 220a and 220b exist, these property files do not specify any property value for ID3.PROP2 and therefore the final resulting value for ID3.PROP2 is HIDE (as specified in file 220c).

For UI element ID4, the property value for ID4.PROP2 is the default value of ENABLE as specified in 202. Although the property files 220a-220c exist, none of these files specify a property value for ID4.PROP2 and therefore the final resulting value for ID4.PROP2 is ENABLE (as specified in 202).

Figure 5:
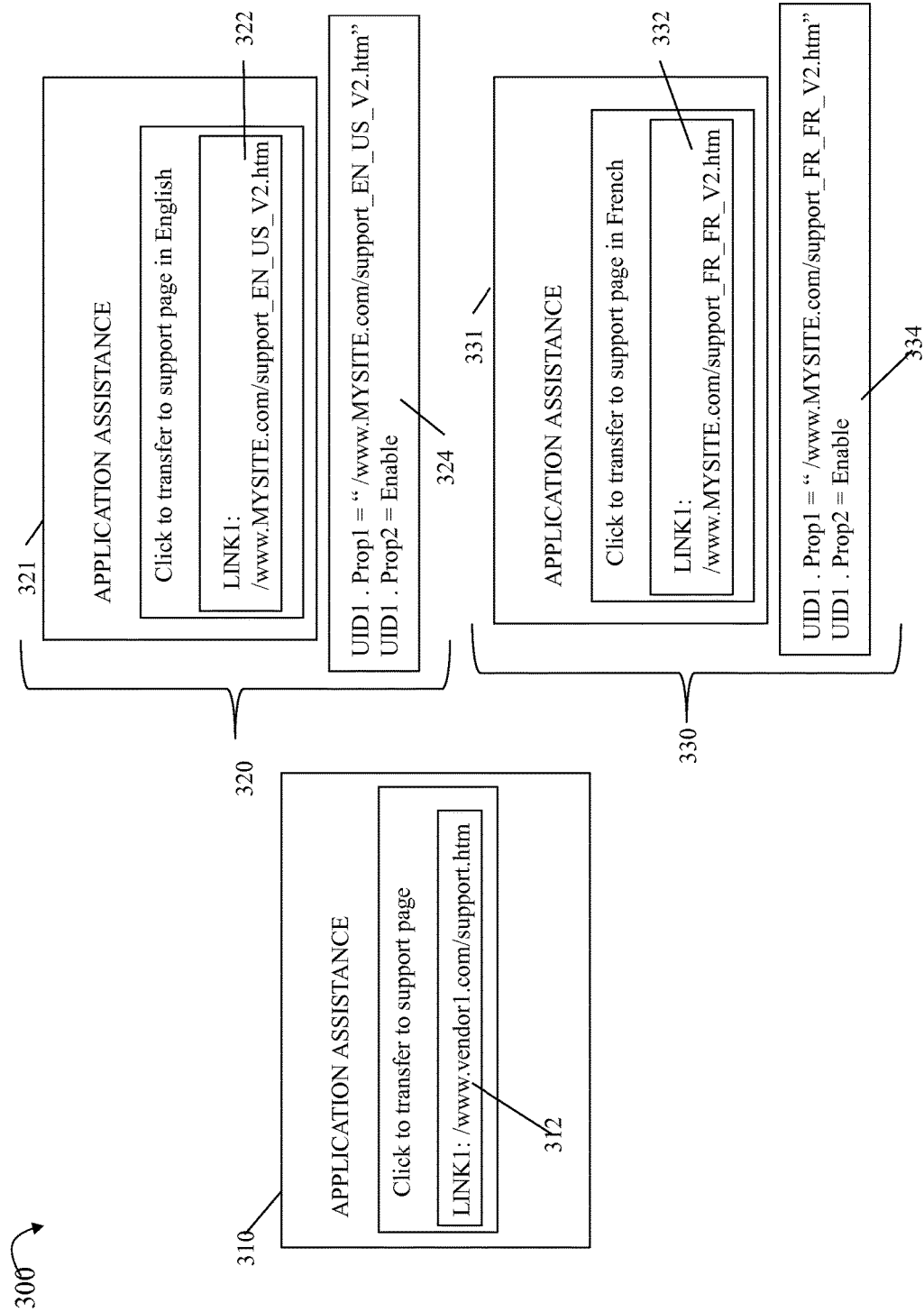

As another example, reference is made to FIG. 5. In the example 300 of FIG. 5, a UI may include a button or other UI element 312 providing a link to a support page. By selecting the UI element 312, the user may then be linked to another location providing the support page, for example, with resources and information for support assistance with the application. For this example, assume there is a first vendor1 and a second vendor 2 in the sales and/or distribution chain. Vendor 1 may supply an application which is purchased for resale and/or redistribution by vendor 2. Thus, vendor 2 may customize aspects of the UI for the application using techniques herein by specifying property values in a property file.

Element 310 may illustrate a screenshot of a UI including a UI element 312 providing a hyperlink to a location of a web support page for vendor 1. If no customization is made by vendor 2, element 310 illustrates the default UI displayed. Upon selection of the hyperlink 312, the user will be linked to the the web page—/www.vendor1.com/support.htm—at vendor 1's website. The web page www.vendor1.com/support.htm is processed and displayed as the support page by default. UI element 312 may have a unique UI element identifier of UID1 with two properties—Prop 1 identifying the location of the webpage processed in response to selection of the UI element and Prop2 specifying a display state of enable, disable or hidden for the UI element 312.

Vendor 2, however, provides UI customizations for both the US in English and also for France in French using two property files included in the look-up chain. Element 320 includes a screenshot 321 of a UI customized using property values included in a first property file 324 for the US English variation by vendor 2. In this example 320, the displayed UI provides for transfer of control or display of a different support web page of the second vendor (rather than the first vendor) in English at www.MYSITE.com/support_EN_US_V2.htm.

Element 330 includes a screenshot 331 of a UI customized using property values included in a second property file 334 for the French variation by vendor 2. In this example 330, the displayed UI provides for transfer of control or display of a different support web page of the second vendor (rather than the first vendor) in French at www.MYSITE.com/support_FR_FR_V2.htm.

Figure 6:
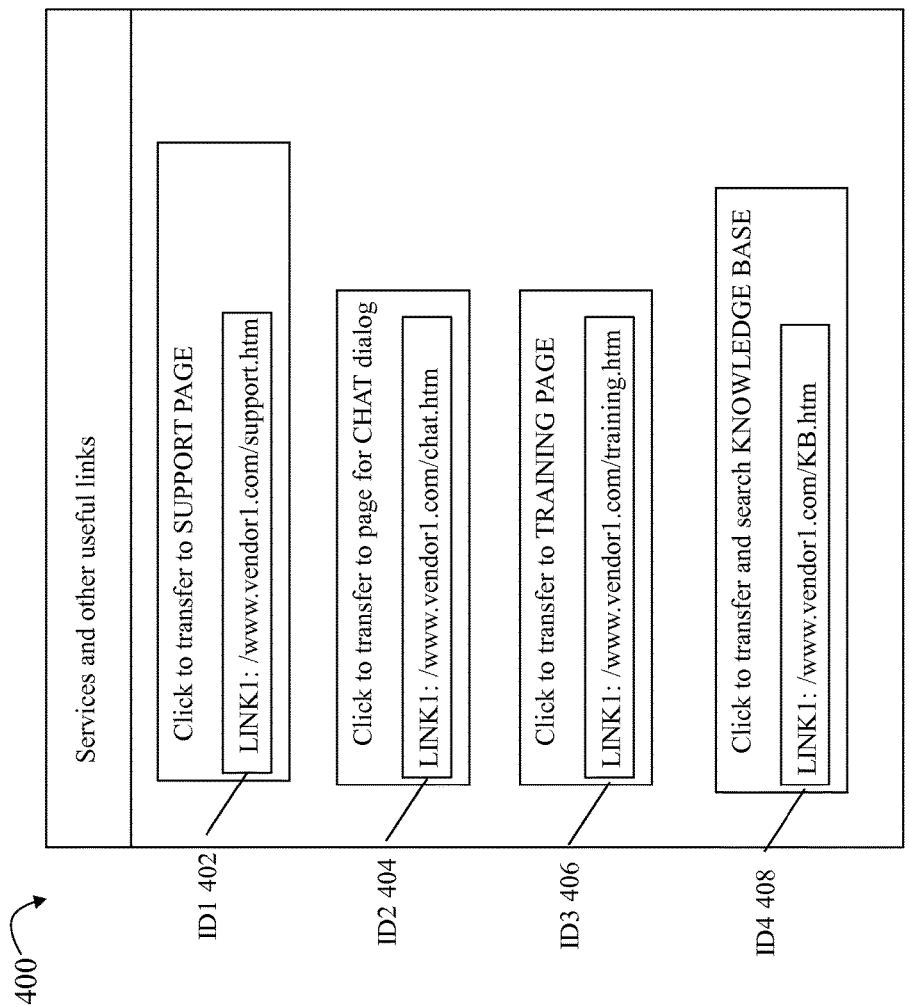
Figure 7:
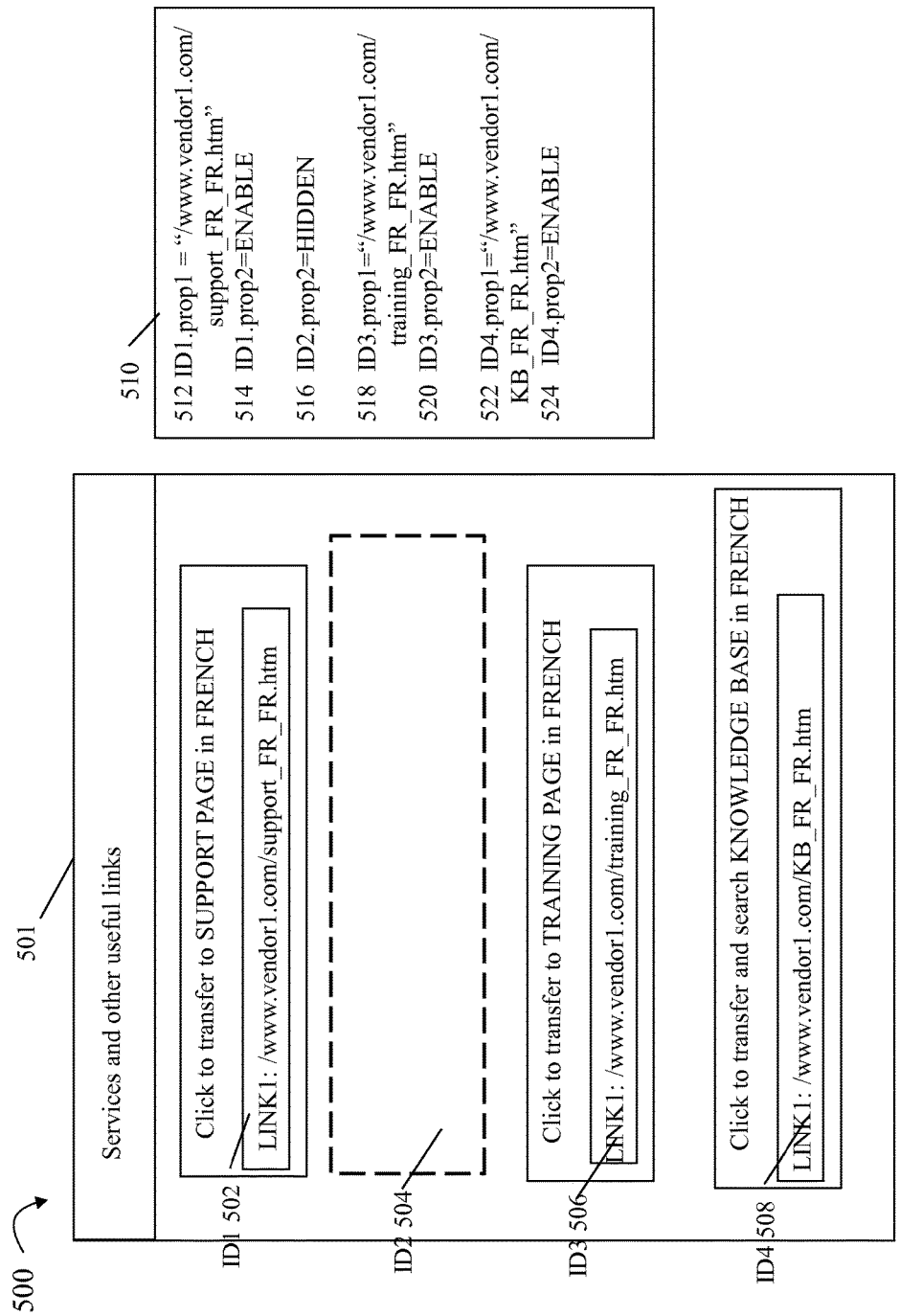
Figure 8:
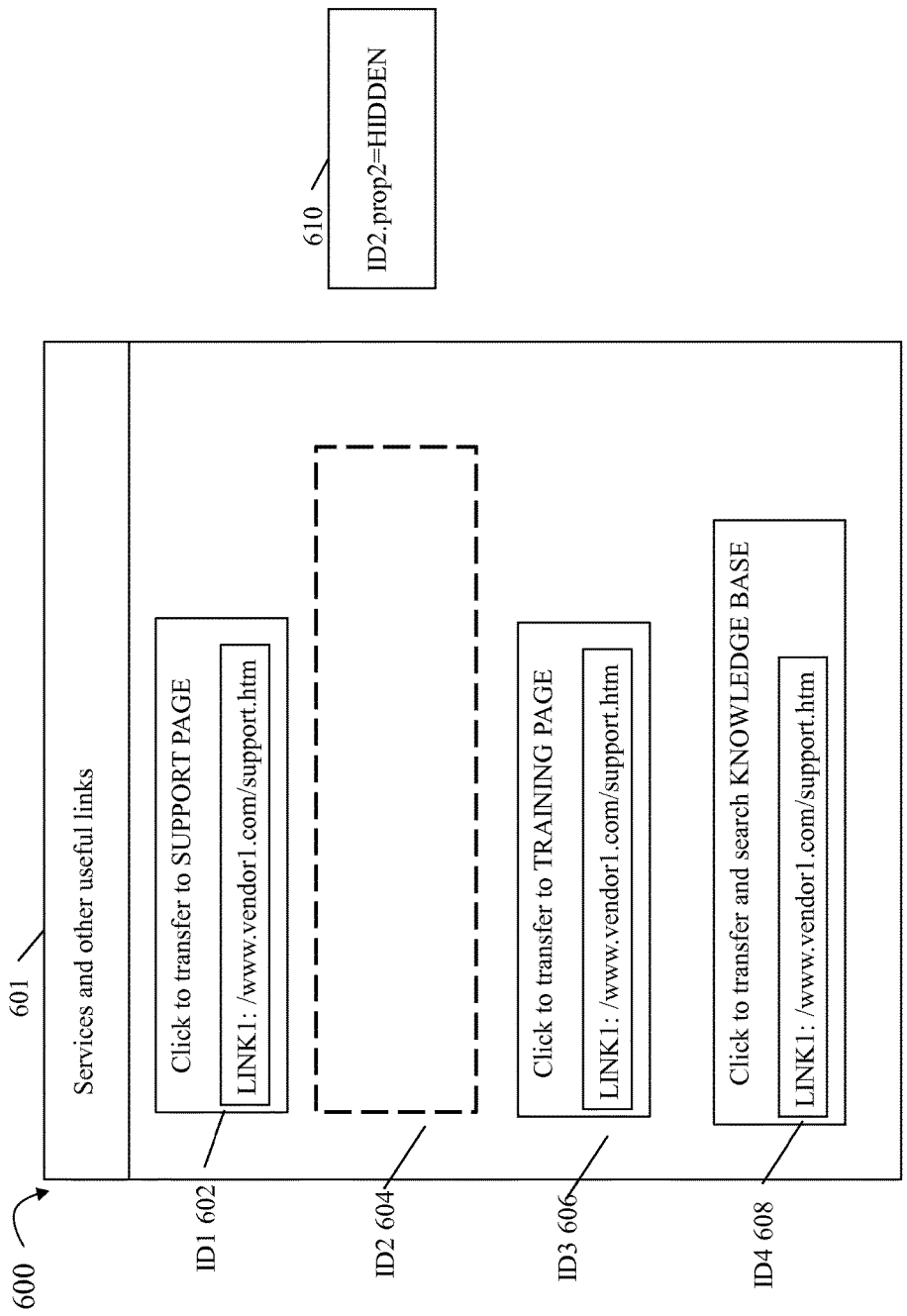

As another example, reference is made to FIGS. 6, 7, and 8. Referring first to FIG. 6, shown is a screenshot of a UI displayed with default values provided by the first vendor of an application. The displayed UI may include 4 UI elements denoted as ID1 402, ID2 404, ID3 406, and ID4 408 providing links to a support page as well as other useful links to pages including information related to the application provided by vendor 1. Each of the UI elements 402, 404 406 and 408 may have a unique UI element identifier and include two properties—Prop 1 identifying the location of the webpage processed in response to selection of the UI element and Prop2 specifying a display state of enable, disable or hidden for the UI element.

ID1 402 may be a UI element providing a link to a support page such as described above. ID2 may be a UI element providing a link to a page for a CHAT dialog. The CHAT dialog may provide for live chat interaction between a user and an agent or other support personnel such as for information regarding product sales, problems and trouble shooting, and the like. Thus, it may be that such a CHAT dialog is conducted in a particular language such as French or English. ID3 406 may be a UI element providing a link to a training page such as listing training classes offered by vendor 1 relate to the application and/or another product. ID4 408 may be a UI element providing a link to a knowledge base where a user may, for example, type in a question or key words used as query search terms for searching the knowledge base (e.g., database) of information. Such searching may be performed, for example, by a user wishing to retrieve information regarding a particular problem or topic of interest such as may be related to the application.

In this example, all UI elements 402, 404, 406 and 408 transfer control to a particular web page at vendor 1's website by default and are enabled.

With reference now to FIG. 7, vendor 1 may also include a language variant customization of the UI for French. Element 501 illustrates a customized version of the screenshot from FIG. 6 for French. The UI customizations may be specified using a property file 510 provided by vendor 1 which, when applied with the application's UI, results in a customized display of the UI 501. In this example, note that elements 512, 518, and 522 specify links to web pages that may be written in French or otherwise include customized variations particular to France or in the French language. Element 516 denotes that UI element ID2 504 is HIDDEN and therefore does not appear in the displayed UI. ID2 may be a UI element associated with a hyperlink for CHAT support. However, vendor 1 may not provide chat support in the French language. For example, vendor 1 may not employ French-speaking agents or other personnel for chat support service. Thus, when displaying the UI 501 in France as used by the French language user, UI element ID2 504 may be hidden as denoted by the italicized rectangle.

With reference now to FIG. 8, vendor 2 as described above may resell vendor 1's application and may only provide UI customizations for the US in English. Vendor 2 may not include a property file variant for UI customization in France or based on the French language. Thus, vendor 2 may include a single property file including content denoted by 610. In this example, vendor 2 does not offer chat service and wants to direct users to vendor 1's website and associated web pages as illustrated in the default screenshot of FIG. 6. Element 601 may denote the customized UI by vendor 2 as just described obtained by applying the property file 610.

It should be noted that the techniques herein may be utilized in an embodiment having a look-up chain of one or more property files including as few as a single property file or any number of property files.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of displaying a user interface of an application comprising:
    providing a plurality of property files corresponding to a plurality of human languages, wherein the plurality of property files are included in a predetermined look-up chain of property files including:
        a property file specifying property values for use with a first human language, wherein the property file specifies a first value for a first property of a first of a plurality of application-wide unique identifiers uniquely identifying a user interface element included in the user interface of the application, wherein the user interface comprises a plurality of user interface elements including said user interface element and each of the plurality of user interface elements is uniquely identified by a different one of the plurality of application-wide unique identifiers, wherein said first property indicates a target network address from which a webpage is retrieved responsive to selecting the user interface element associated with said target network address and wherein the first value denotes a first webpage for the first human language as the target network address; and
        a second property file of customizations of the user interface for the second human language, said second property file specifying a second value for a second property of the first application-wide identifier, wherein the second property indicates a display state of the user interface element and the second value indicates that functionality associated with the user interface element is unsupported in the second human language and that the user interface element is hidden when the user interface is customized for use with the second human language; and
    executing said application, wherein said executing said application includes performing first processing comprising:
        creating said user interface element, the first application-wide unique identifier identifying said user interface element and having a set of one or more properties and a default value for each property in said set, said set of one or more properties including said first property, said second property and a third property;
        determining current values for the first property, the second property, and the third property of the first application-wide unique identifier, wherein said determining is performed in accordance with a current human language of the user interface and in accordance with the predetermined look-up chain of property files; and
        displaying the user interface including the user interface element in accordance with current values for the first property, the second property and the third property of the first application-wide unique identifier; and wherein said determining current values further comprises:
            determining whether said current human language is said second human language and whether the second property file specifies a value for the second property of the first application-wide unique identifier;
            responsive to determining that the current human language is the second human language and that the second property specifies a value for the second property of the first application-wide unique identifier, setting the current value of the second property of the first application-wide unique identifier as the second value whereby the user interface element is hidden when the user interface is displayed;
            determining whether the current human language is the first human language and whether a value is specified for the third property of the first application-wide unique identifier in the predetermined look-up chain of property files; and
            responsive to determining that the current human language is the first human language and no value is specified for a third property of the first application-wide unique identifier in the predetermined look-up chain of property files, setting the current value for said third property of the first application-wide unique identifier to said default value.

2. The method of claim 1, wherein at least one other property of the set of one or more properties of the user interface element affects a visual aspect of said user interface element when displayed.

3. The method of claim 2, wherein the at least one other property of the set of one or more properties of the user interface element affects any of a font, a text size, a color, a physical dimension, a height, a width, and a location or placement of said user interface element in connection with said displaying.

4. The method of claim 1, wherein at least one other property of the set of one or more properties of the user interface element affects user interaction with said user interface element.

5. The method of claim 4, wherein said at least one other property of the set of one or more properties of the user interface element affects whether said user interface element is any of enabled, disabled and hidden when displaying the user interface.

6. The method of claim 1, wherein a second user interface element of the user interface of the application is any of a menu, a menu bar, a menu item, a text box, a button, a navigation section including one or more hyperlinks, a hyperlink, a table, a drop-down list, a list box, a check box, a dialog box, a wizard, and a combo box.

7. The method of claim 1, wherein said property file includes a key-value pair to specify said first value for said first property of the first application-wide unique identifier identifying said user interface element.

8. The method of claim 1, further comprising:
    creating the user interface element as an instance of an object defined in a class of a library that invokes a look-up service at runtime of the application to obtain a current property value for each property of the set of one or more properties for the user interface element.

9. The method of claim 8, wherein said property file is one of a plurality of property files included in a predetermined look-up chain of property files.

10. The method of claim 8, wherein said predetermined look-up chain of property files defines an ordered list of the property files from which property values are retrieved.

11. The method of claim 10, wherein first property values are read from a first property file included in said predetermined look-up chain prior to reading second property values from the second property file.

12. The method of claim 11, wherein a third value is specified for one property of the first application-wide unique identifier in said first property file and a fourth value is specified for said one property of the first application-wide unique identifier in said second property file whereby said one property is set to said fourth value that overrides said third value due to an order of precedence of the property files in accordance with said predetermined look-up chain.

13. The method of claim 10, wherein said predetermined look-up chain of the property files includes one or more property files in accordance with a chain of entities distributing said application thereby providing for user interface customizations by said entities.

14. The method of claim 10, wherein said predetermined look-up chain of the property files includes one or more property files specifying different user interface settings customized in accordance with any of a geographic location, a human language, and dialect of a particular human language.

15. The method of claim 10, wherein each file in said predetermined look-up chain is determined in accordance with a file naming pattern or convention.

16. The method of claim 10, wherein the look-up service is invoked to locate the property files of the predetermined look-up chain and to process content of the property files of the predetermined look-up chain in accordance with said ordered list to determine final values for properties of the plurality of application-wide unique identifiers included in any of the property files.

17. A non-transitory computer readable medium comprising code stored thereon that, when executed, performs a method of displaying a user interface of an application comprising:
providing a plurality of property files corresponding to a plurality of human languages, wherein the plurality of property files are included in a predetermined look-up chain of property files including:
a property file specifying property values for use with a first human language, wherein the property file specifies a first value for a first property of a first of a plurality of application-wide unique identifiers uniquely identifying a user interface element included in the user interface of the application, wherein the user interface comprises a plurality of user interface elements including said user interface element and each of the plurality of user interface elements is uniquely identified by a different one of the plurality of application-wide unique identifiers, wherein said first property indicates a target network address from which a webpage is retrieved responsive to selecting the user interface element associated with said target network address and wherein the first value denotes a first webpage for the first human language as the target network address; and
a second property file of customizations of the user interface for the second human language, said second property file specifying a second value for a second property of the first application-wide identifier, wherein the second property indicates a display state of the user interface element and the second value indicates that functionality associated with the user interface element is unsupported in the second human language and that the user interface element is hidden when the user interface is customized for use with the second human language; and
executing said application, wherein said executing said application includes performing first processing comprising:
creating said user interface element, the first application-wide unique identifier identifying said user interface element and having a set of one or more properties and a default value for each property in said set, said set of one or more properties including said first property, said second property and a third property;
determining current values for the first property, the second property, and the third property of the first application-wide unique identifier, wherein said determining is performed in accordance with a current human language of the user interface and in accordance with the predetermined look-up chain of property files; and
displaying the user interface including the user interface element in accordance with current values for the first property, the second property and the third property of the first application-wide unique identifier; and wherein said determining current values further comprises:
determining whether said current human language is said second human language and whether the second property file specifies a value for the second property of the first application-wide unique identifier;
responsive to determining that the current human language is the second human language and that the second property specifies a value for the second property of the first application-wide unique identifier, setting the current value of the second property of the first application-wide unique identifier as the second value whereby the user interface element is hidden when the user interface is displayed;
determining whether the current human language is the first human language and whether a value is specified for the third property of the first application-wide unique identifier in the predetermined look-up chain of property files; and
responsive to determining that the current human language is the first human language and no value is specified for a third property of the first application-wide unique identifier in the predetermined look-up chain of property files, setting the current value for said third property of the first application-wide unique identifier to said default value.

18. The non-transitory computer readable medium of claim 17, wherein at least one other property of the set of one or more properties of the user interface element affects any of a visual aspect of said user interface element when displayed, and user interaction with said user interface element.

19. The non-transitory computer readable medium of claim 18, wherein the at least one other property of the set of one or more properties of the user interface element affects any of a font, a text size, a color, a physical dimension, a height, a width, and a location or placement of said user interface element in connection with said displaying.

20. A system comprising:
a processor; and
a memory comprising code stored thereon that, when executed, performs a method of displaying a user interface of an application comprising:

providing a plurality of property files corresponding to a plurality of human languages, wherein the plurality of property files are included in a predetermined look-up chain of property files including:
  a property file specifying property values for use with a first human language, wherein the property file specifies a first value for a first property of a first of a plurality of application-wide unique identifiers uniquely identifying a user interface element included in the user interface of the application, wherein the user interface comprises a plurality of user interface elements including said user interface element and each of the plurality of user interface elements is uniquely identified by a different one of the plurality of application-wide unique identifiers, wherein said first property indicates a target network address from which a webpage is retrieved responsive to selecting the user interface element associated with said target network address and wherein the first value denotes a first webpage for the first human language as the target network address; and
  a second property file of customizations of the user interface for the second human language, said second property file specifying a second value for a second property of the first application-wide identifier, wherein the second property indicates a display state of the user interface element and the second value indicates that functionality associated with the user interface element is unsupported in the second human language and that the user interface element is hidden when the user interface is customized for use with the second human language; and
executing said application, wherein said executing said application includes performing first processing comprising:
  creating said user interface element, the first application-wide unique identifier identifying said user interface element and having a set of one or more properties and a default value for each property in said set, said set of one or more properties including said first property, said second property and a third property;
  determining current values for the first property, the second property, and the third property of the first application-wide unique identifier, wherein said determining is performed in accordance with a current human language of the user interface and in accordance with the predetermined look-up chain of property files; and
displaying the user interface including the user interface element in accordance with current values for the first property, the second property and the third property of the first application-wide unique identifier; and wherein said determining current values further comprises:
  determining whether said current human language is said second human language and whether the second property file specifies a value for the second property of the first application-wide unique identifier;
  responsive to determining that the current human language is the second human language and that the second property specifies a value for the second property of the first application-wide unique identifier, setting the current value of the second property of the first application-wide unique identifier as the second value whereby the user interface element is hidden when the user interface is displayed;
  determining whether the current human language is the first human language and whether a value is specified for the third property of the first application-wide unique identifier in the predetermined look-up chain of property files; and
  responsive to determining that the current human language is the first human language and no value is specified for a third property of the first application-wide unique identifier in the predetermined look-up chain of property files, setting the current value for said third property of the first application-wide unique identifier to said default value.

* * * * *